(12) United States Patent
Entsminger et al.

(10) Patent No.: US 8,240,597 B2
(45) Date of Patent: Aug. 14, 2012

(54) UAV DUCTED FAN LIP SHAPING

(75) Inventors: Adam Entsminger, Blacksburg, VA (US); Bruce Dan Bouldin, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 952 days.

(21) Appl. No.: 12/187,172

(22) Filed: Aug. 6, 2008

(65) Prior Publication Data

US 2012/0126064 A1 May 24, 2012

(51) Int. Cl.
*B64C 29/00* (2006.01)
(52) U.S. Cl. ........................................ 244/23 C
(58) Field of Classification Search .............. 244/12.2, 244/23 C, 53 B, 7 B, 134 A
See application file for complete search history.

(56) References Cited

U.S. PATENT DOCUMENTS

| | | | |
|---|---|---|---|
| 2,996,269 A * | 8/1961 | Parry ........................ 244/17.19 |
| 3,103,327 A * | 9/1963 | Parry ............................ 244/52 |
| 3,108,764 A * | 10/1963 | Sudrow ...................... 244/23 C |
| 3,127,093 A * | 3/1964 | Sudrow ........................... 415/66 |
| 3,167,273 A | 1/1965 | Calderon |
| 3,249,323 A | 5/1966 | Vanderlip |
| 3,456,902 A | 7/1969 | Visconti |
| 3,524,611 A * | 8/1970 | Frank .......................... 244/53 B |
| 3,559,922 A | 2/1971 | Gluhareff |
| 3,763,874 A | 10/1973 | Wilde et al. |
| 5,108,044 A | 4/1992 | Weiner et al. |
| 5,131,604 A | 7/1992 | Yoerkie, Jr. et al. |
| 5,150,857 A | 9/1992 | Moffitt et al. |
| 5,152,478 A * | 10/1992 | Cycon et al. ................. 244/12.2 |
| 5,295,643 A | 3/1994 | Ebbert et al. |
| 5,575,438 A | 11/1996 | McGonigle et al. |
| 5,695,153 A | 12/1997 | Britton et al. |
| 5,746,390 A | 5/1998 | Chiappetta |
| 5,890,441 A | 4/1999 | Swinson et al. |
| 6,231,006 B1 * | 5/2001 | Gruensfelder et al. ..... 244/53 B |
| 6,450,445 B1 | 9/2002 | Moller |
| 6,464,166 B1 | 10/2002 | Yoeli |
| 6,604,706 B1 | 8/2003 | Bostan |
| 6,666,403 B1 | 12/2003 | Follensbee |
| 6,691,949 B2 | 2/2004 | Plump et al. |
| 6,721,646 B2 | 4/2004 | Carroll |

(Continued)

FOREIGN PATENT DOCUMENTS

EP      1767453      6/2008

(Continued)

OTHER PUBLICATIONS

European Search Report from counterpart EP Application No. 09161872.8, mailed Apr. 5, 2012, 3 pages.

(Continued)

*Primary Examiner* — Tien Dinh
*Assistant Examiner* — Keith L Dixon
(74) *Attorney, Agent, or Firm* — Shumaker & Sieffert, P.A.

(57) ABSTRACT

A ducted fan air-vehicle having a duct lip shape is described. The duct lip has an internal duct lip portion and an external duct lip portion, both of which are substantially curvature continuous around the circumference of the air duct. The duct has a plurality of cross-sections along its circumference and at least some of the plurality of cross-sections have a different shape. Further, each cross-section around the circumference of the duct has an a/b ratio and the a/b ratio for each cross-section is substantially the same.

20 Claims, 6 Drawing Sheets

U.S. PATENT DOCUMENTS

| | | | |
|---|---|---|---|
| 6,886,776 B2 | 5/2005 | Wagner et al. | |
| 6,974,106 B2 | 12/2005 | Churchman | |
| 7,032,861 B2 | 4/2006 | Sanders, Jr. et al. | |
| 7,044,422 B2 | 5/2006 | Bostan | |
| 7,249,732 B2 | 7/2007 | Sanders, Jr. et al. | |
| 7,556,218 B2 * | 7/2009 | Schlunke | 244/12.2 |
| 2004/0094662 A1 | 5/2004 | Sanders, Jr. et al. | |
| 2004/0129828 A1 | 7/2004 | Bostan | |
| 2005/0082421 A1 | 4/2005 | Perlo et al. | |
| 2006/0049304 A1 | 3/2006 | Sanders, Jr. et al. | |
| 2006/0192047 A1 | 8/2006 | Goossen | |
| 2006/0231675 A1 | 10/2006 | Bostan | |
| 2007/0034738 A1 | 2/2007 | Sanders, Jr. et al. | |
| 2007/0034739 A1 | 2/2007 | Yoeli | |
| 2007/0051848 A1 | 3/2007 | Mantych et al. | |
| 2007/0193650 A1 | 8/2007 | Eannati | |
| 2007/0221790 A1 | 9/2007 | Goossen | |
| 2007/0228214 A1 | 10/2007 | Horak | |
| 2007/0244608 A1 | 10/2007 | Rath et al. | |
| 2007/0262195 A1 | 11/2007 | Bulaga et al. | |
| 2007/0295298 A1 | 12/2007 | Mark | |

FOREIGN PATENT DOCUMENTS

| | | |
|---|---|---|
| EP | 2 147 858 A2 | 1/2010 |
| EP | 2 151 379 A2 | 2/2010 |
| EP | 2 151 380 A2 | 2/2010 |
| GB | 2 372 019 A | 8/2002 |
| WO | 0015497 | 3/2000 |
| WO | 2004002821 | 1/2004 |

OTHER PUBLICATIONS

European Examination Report from counterpart EP Application No. 09161872.8, mailed Apr. 19, 2012, 7 pages.

* cited by examiner

UAV DUCTED FAN LIP SHAPING

GOVERNMENT RIGHTS

The United States Government has acquired certain rights in this invention pursuant to Contract No. W56 HZV-05-C-0724, awarded by the United States Army.

FIELD

The present invention relates generally to ducted fan air-vehicles, and more particularly, relates to the shape of the duct lip of ducted fan air-vehicles.

BACKGROUND

Ducted fan air-vehicles, such as an Unmanned Aerial Vehicle (UAV), may have at least one ducted fan and a fan engine to drive the fan blades. Ducted fan air-vehicles are well-know for performance capability in multiple flight conditions. For instance, ducted fan air-vehicles have the ability of forward flight and are well known for stationary hovering aerodynamic performance.

FIG. 1 is a pictorial representation of a typical ducted fan-air vehicle 100. The ducted fan air-vehicle 100 includes an air duct 102 having a duct lip 104 and a fan 106 located within the air duct 102. The ducted fan air-vehicle may have a center body 108. The center body 108 may be a housing that contains other components of the air-vehicle 100. The center body 108 may contain an engine for powering the air-vehicle 100. The center body 108 may contain additional components for air-vehicle operation, such as an avionics system.

The ducted fan air-vehicle 100 may also include a stator assembly 110 and vanes 112 for providing thrust vectoring. The stator assembly 110 and vane 112 may be located under the fan 106 located within the air duct 102. The stator assembly 110 may be located just under the fan 106 in the air duct 102 to reduce or eliminate the swirl and torque produced by the fan 106. The vanes 112 may also be placed under the fan 106. For instance, the vanes 112 may be placed slightly below an exit section 114 of the air duct 102. The air-vehicle 100 may contain fixed and/or movable vanes 112 to perform thrust vectoring for the air-vehicle 100.

In order to be effective and controllable in multiple flight conditions, ducted fan air-vehicles such as air-vehicle 100 preferably have clean and attached air flow around the duct lip in the multiple flight conditions. Further, ducted fan air-vehicles preferably have a favorable center of gravity in order to be effective and controllable. A uniform inflow velocity profile into the fan is also desirable to minimize the acoustic signature of the duct-fan interaction.

Additionally, ducted fan air-vehicles may need to carry a variety of components when in operation. For instance, in operation ducted fan air-vehicles may need to carry, without limitation, visual sensors, infrared sensors, cameras, radio communication devices, inertial sensor units, ground level sensor units, and/or payload. Due to the limited size of the ducted fan air-vehicle, in order to store the variety of units in the ducted fan, the units may be placed in external pods that are attached to the ducted fan air-vehicle. These pods may (i) cause a shift in the center of gravity, (ii) create negative interference with airflow characteristics inside the duct by blocking air intake and exhaust, and (iii) create additional drag on the UAV when the UAV is in forward flight. Additionally, the added weight of the equipment may require additional engine capacity and fuel storage capacity. It may be beneficial to increase the volume within the duct lip in order to decrease or eliminate the need for external pods while maintaining the aerodynamic requirements of a ducted fan air-vehicle.

Therefore, it would be beneficial to provide a ducted fan air-vehicle with a duct lip shape that allows for increased volume within the duct lip while still meeting the aerodynamic, center of gravity, controllability, acoustic, weight, and drag requirements of a ducted fan air-vehicle.

SUMMARY

The present disclosure describes a ducted fan air-vehicle having a duct lip shape and a method for shaping a duct lip of a ducted fan air-vehicle. The ducted fan air-vehicle includes an air duct having a duct lip and a circumference. The duct lip has an internal duct lip portion and an external duct lip portion. The shape of the internal duct lip portion is substantially curvature continuous around the circumference of the air duct, and the shape of the external duct lip portion is also substantially curvature continuous around the circumference of the air duct. At least some of the plurality of cross-sections around the circumference of the duct have different shapes. Further, each cross-section has an a/b ratio and the a/b ratio of each cross-section of the duct is substantially the same.

The air duct may be a square-shaped duct, which has exterior bulges around the corners. Further, the air duct may be claw-shaped so that the duct lip has a plurality of peaks and a plurality of troughs. Such duct lip shapes satisfy the aerodynamic requirements of a ducted fan air-vehicle through low distortion and reduced drag. The shape of the duct lip described provides good flow attachment at various flow conditions and keeps velocity and pressure substantially uniform at the fan face while allowing for variations in the geometry of the duct lip in order to help with storage.

A method for shaping a duct lip of a ducted fan air-vehicle is also described. A duct having a circumference and a plurality of cross-sections around the circumference of the duct may be formed. One may design a duct having a duct lip so that at least some of the plurality of cross-sections have a different shape. Further, one may design the shape of the duct lip such that the a/b ratio of each cross-section is substantially the same and the duct lip is substantially curvature continuous.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 3b is a graph of a wide cross-section and a narrow cross-section of the air duct depicted in FIG. 3a.

DETAILED DESCRIPTION

Ducted-fan air-vehicles are known for their superior stationary aerodynamic hovering performance, three-dimensional precision position hold, low speed flights, precision vertical take-off and landing ("VTOL") and safe close-range operations. Ducted fan air-vehicles may be preprogrammed to perform operations autonomously, or they may be controlled by a human operator. Therefore, ducted fan air-vehicles may be unmanned aerial vehicles ("UAV").

UAVs may have avionics equipment on board to control the flight and operation of the UAV. For instance, the avionics may control the direction, flight, stability compensation, and other aspects of flight control. Additionally, UAVs may carry a variety of equipment on board tailored to the mission the UAVs are assigned to accomplish. UAVs may carry sensors on board to obtain information about surroundings, or the UAVs may carry a payload to be deposited at a target site. The UAV engine to drive the UAV requires that fuel be carried on board the UAV. The avionics equipment, sensors, payload, and fuel may be stored on the UAV.

As discussed above, in order to be effective and controllable in multiple flight conditions, ducted fan air-vehicles preferably have clean and attached air flow around the duct lip in the multiple flight conditions. Further, ducted fan air-vehicles preferably have a favorable center of gravity in order to be effective and controllable. A uniform inflow velocity profile into the fan is also desirable to minimize the acoustic signature of the duct-fan interaction.

The present invention describes a ducted fan air-vehicle having a useful duct lip shape and a method for shaping a duct lip of a ducted fan air-vehicle. The method and system provide for increased volume within the duct lip while still meeting the aerodynamic, center of gravity, controllability, acoustic, weight, and drag requirements of a ducted fan air-vehicle. The shape of the duct lip is carefully controlled to maintain the aerodynamic, center of gravity, controllability, acoustic, weight, and drag requirements of a ducted fan air-vehicle. Further, shaping the duct lip in accordance with a preferred embodiment can lead to and/or be incorporated with various duct designs that provide additional storage in the duct by creating a larger area between the inside and outside wall of the duct at intervals along the circumference of the duct.

Figure 1:
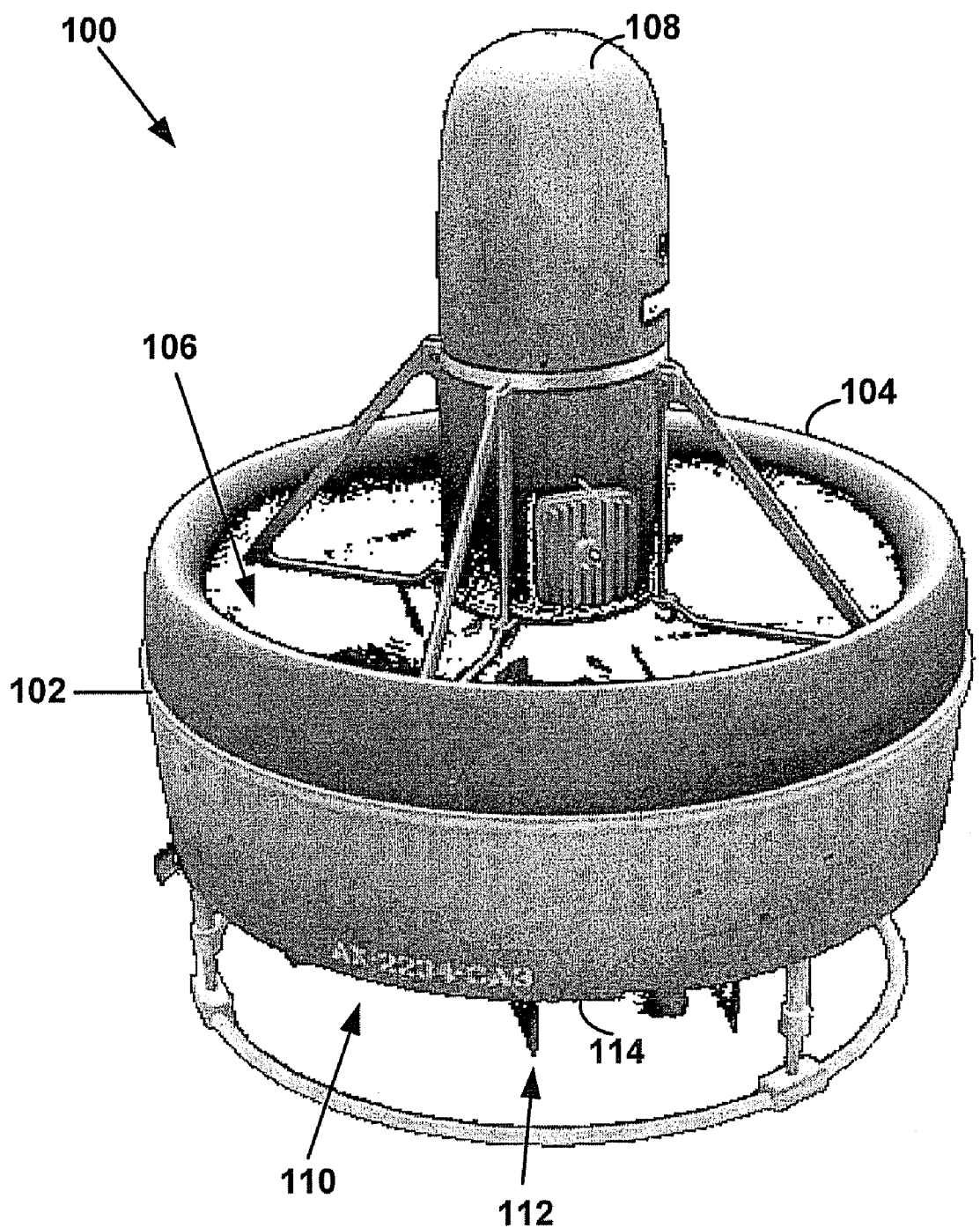
FIG. 1 is a pictorial representation of a ducted fan air-vehicle.
Figure 2B:
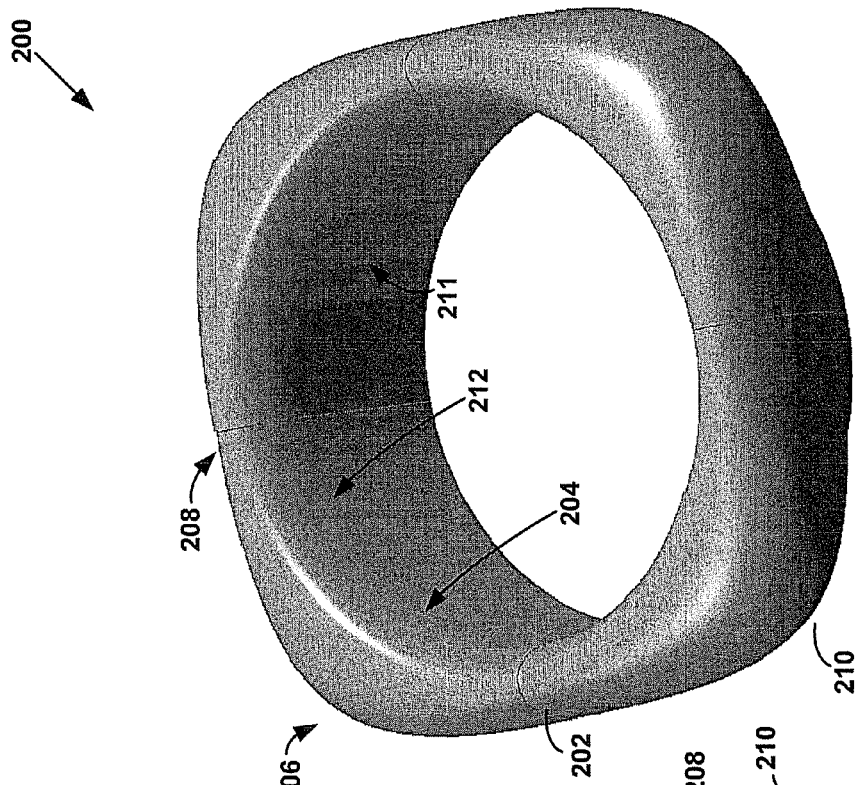
FIG. 2b is a pictorial representation of a perspective view of an air duct having a duct lip shape, according to an example.
Figure 2A:
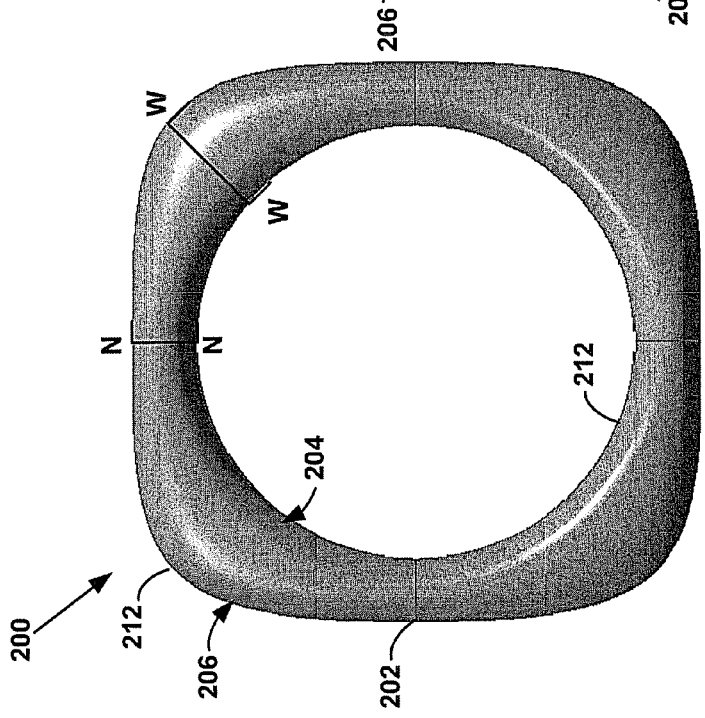
FIG. 2a is a pictorial representation of a top view of an air duct having a duct lip shape, according to an example.
Figure 2C:
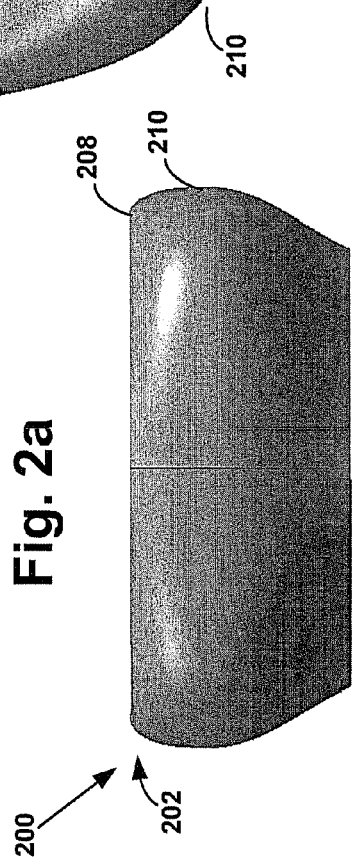
FIG. 2c is a pictorial representation of a side view of the an air duct having a duct lip shape, according to an example.
Figure 2D:
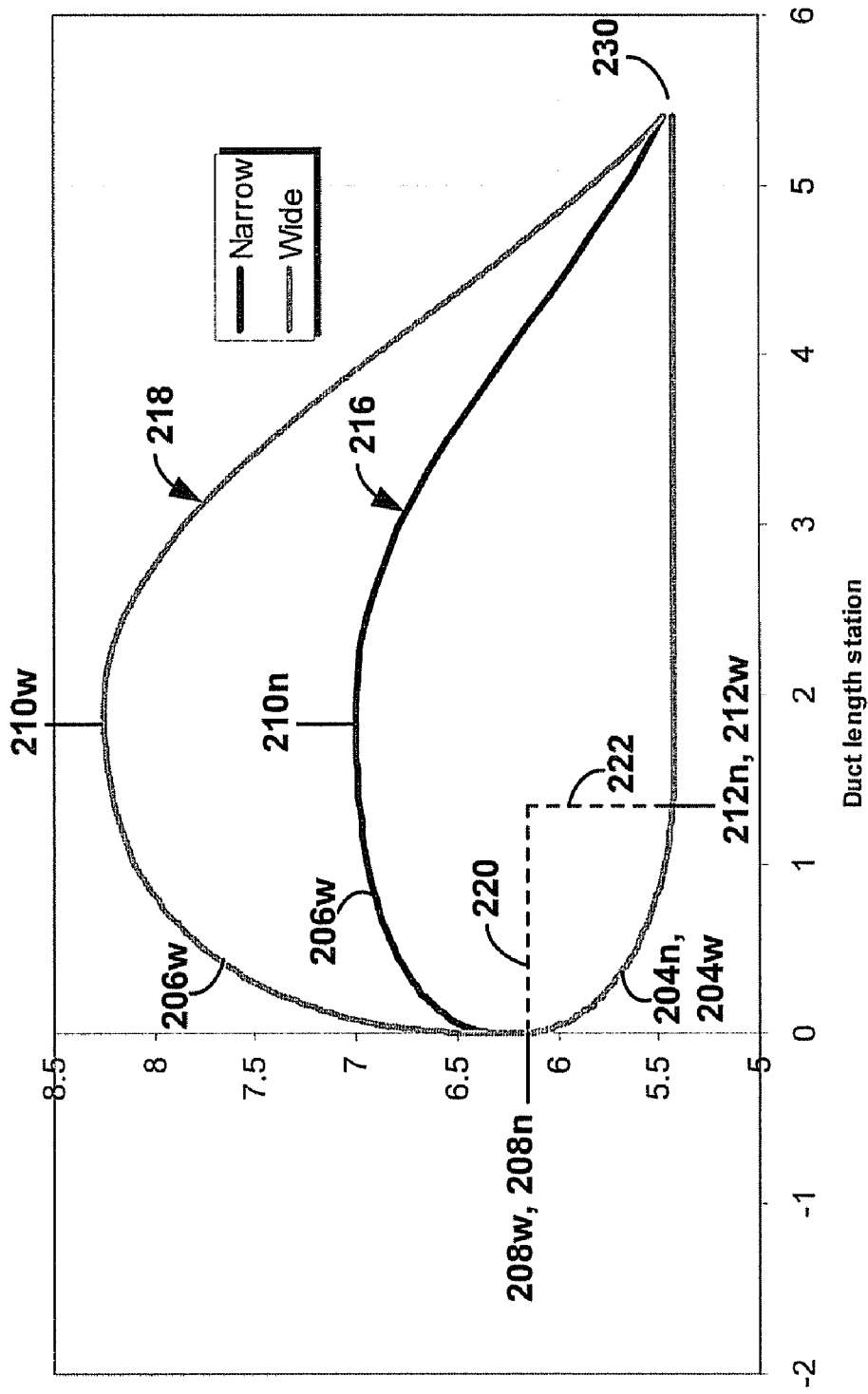
FIG. 2d is a graph of a wide cross-section and a narrow cross-section of the air duct depicted in FIGS. 2a-2c.

A duct having a duct lip shape in accordance with a preferred embodiment may be described by reference to FIGS. 2a-2d. FIGS. 2a-2c are pictorial representations of an air duct 200 in accordance with a preferred embodiment. Duct 200 may be a duct for a ducted fan air-vehicle, such as the ducted fan air-vehicle 100 depicted in FIG. 1. Specifically, FIG. 2a is a pictorial representation of a top view of air duct 200 having a duct lip shape in accordance with a preferred embodiment. FIG. 2b is a pictorial representation of a perspective view of air duct 200 having a duct lip shape in accordance with a preferred embodiment. FIG. 2c is a pictorial representation of a side view of the air duct 200 having a duct lip shape in accordance with a preferred embodiment. Further, FIG. 2d is a graph of a wide cross-section and a narrow cross-section of the air duct 200 depicted in FIGS. 2a-2c.

As depicted in FIGS. 2a-2c, duct 200 has a duct lip 202. Duct lip 202 comprises an internal duct lip portion 204 and an external duct lip portion 206. A cross-section of the duct may be taken from a plane emanating radially out from the centerline of the duct. Duct 200 has a plurality of cross-sections around the circumference of the duct. For example, a cross-section may be taken at the line depicted by N-N, which is a cross-section at a narrow portion of the duct. Further, a cross-section could also be taken at the line depicted by W-W, which is a cross-section at a wide portion of duct 200. Still further, a cross-section could be taken at any other point along the circumference.

Each duct cross-section includes a duct lip highlight location 208 and a location 210 of maximum radial distance. Further, the duct 200 has a location 212 where the throat is located. The throat is the location where the duct lip ends and the fan shroud 211 begins. The fan shroud 211 is the section of the ducted fan where the fan is located. The cross-sections and locations 208, 210, and 212 may be further described with reference to FIG. 2d. FIG. 2d depicts two cross-sections of the duct. Specifically, FIG. 2d depicts a narrow cross-section 216 taken along line N-N in FIG. 2a and a wide cross-section 218 taken along line W-W in FIG. 2a. In FIG. 2d the X-axis represents the axial height of the duct and the Y-axis represents the radial length of the duct from a center of the duct. It should be understood that the values associated with these cross-sections are examples of a preferred embodiment only. Specific values may be varied in accordance with desired duct size, desired aerodynamic characteristics, and other additional design parameters.

Duct lip highlight location 208 is the forward most point on the duct lip 202 in the axial direction. The duct lip highlight location for narrow cross-section 216 is shown as 208n in FIG. 2d and the duct lip highlight location for wide cross-section 218 is shown as 208w in FIG. 2d. Such notation is used at other locations in FIG. 2d in order to distinguish certain locations for narrow cross-section 216 and wide cross-section 218. At the duct lip highlight location 208, the curvature of the duct is tangent to a line going out radially. In other words, the duct highlight location is location where the duct lip is tangent to the radial direction. The location 210 of maximum radial distance is the point of maximum radial thickness in the cross-section. Location 212 is the location of the throat of the air duct 200 where internal duct lip portion 204 ends and the fan shroud begins.

The internal duct lip portion 204 is the portion of the duct lip that goes from duct lip highlight location 208 to the throat location 212. The shape of the internal duct lip portion 204 is defined by the curve between locations 208 and 212. The external duct lip portion 206 goes from the duct lip highlight location 208 to the location 210 of maximum radial thickness. As shown in FIG. 2d, location 210w has a greater radial thickness than location 210n. The shape of the external duct lip portion 206 is defined by the curve between locations 208 and 210.

Each cross-section of the duct 200 has a property defined as the a/b ratio of the duct 200. In the a/b ratio, the a is defined by the line 220, which goes axially from the duct lip highlight location 208 to the location 212 where the throat is located. Further, b is defined by the line 222, which goes radially from the location 212 where the throat is located to duct lip highlight location 208. The a/b ratio is the ratio obtained when the distance of a is divided by the distance of b.

In a preferred embodiment, the a/b ratio is substantially the same in each cross-section taken along the circumference of the duct. As is depicted in FIG. 2d, the a/b ratio for wide cross-section 218 is equal to the a/b ratio for narrow cross-section 216 because a and b are the same for narrow cross-section 216 and wide cross-section 218. In a preferred embodiment, as in FIG. 2d, the a/b ratio of each cross-section is equal to 2. This means that the distance of a is twice as large as the distance of b. Other a/b ratios are possible as well. For instance, the a/b ratio may be within the range 1.5 to 3. Further, it is possible that the a/b ratio of each cross-section of duct 200 is not exactly the same. For example, each a/b ratio of each cross-section may be within a percentage of another. This percentage may vary. For instance, the a/b ratios of each cross-section may be within 10% of the other cross-sections.

In the preferred embodiment depicted in FIGS. 2a-2d, the axial height of the highlight remains constant for each cross-section. As can be seen in FIG. 2d, the highlight location for narrow cross-section 216 (i.e., 208n) is the same as the highlight location for wide cross-section 218 (i.e., 208w). However, the radial distance of the location of maximum thickness may vary for a plurality of cross-sections. Therefore, the shape of at least some of the plurality of cross-sections taken along the circumference are different shapes. As depicted in FIG. 2d, the location 210n of maximum radial distance for the narrow cross-section 216 is equal to approximately 7 and the location 210w of maximum radial distance of wide cross-section 218 is equal to approximately 8.25. In the preferred embodiment, duct 200 has four wide cross-sections located at the corners of duct 200. Such a cross-section design leads to a duct with a plurality of bulges at the external corners of the duct. For instance, such a cross-section design may lead to the square-shaped duct design shown in FIG. 2b.

In FIG. 2d, the axial height of the highlight of both narrow cross-section 216 and wide cross-section 218 from the duct trailing edge 230 is equal to approximately 5.405. This height is also known as the chord. The chord may be larger or smaller depending on the desired duct size and additional design parameters.

In a preferred embodiment, the internal duct lip portion 204 may be elliptically shaped. An elliptical shape may be defined by the following equation:

$$\frac{x^2}{a^2} + \frac{y^2}{b^2} = 1$$

In this case, a of the a/b ratio represents the semi-major axis of the ellipse and b represents the semi-minor axis of the ellipse. Internal duct lip portion may be the curve defined by one quadrant of an ellipse. However, the internal duct lip portion 204 curve may be more or less than one quadrant.

In an alternative preferred embodiment, the internal duct lip portion 204 is super-elliptically shaped. A super-elliptical-shape may be defined by the following equation:

$$\left|\frac{x}{a}\right|^n + \left|\frac{y}{b}\right|^n = 1.$$

In a preferred embodiment, the super elliptical shape defined by the above equation, where the exponent n is in the range of 1.9 to 2.5. However, the exponent n may be larger or smaller depending on the design parameters of the duct and desired air flow conditions at the duct lip. For example, the exponent n may be as large as 5.

The shape of the external duct lip portion 206 may be substantially rounded. For example, the external duct lip portion can be circular or elliptical. Other smooth or substantially curvature continuous shapes are possible as well.

In accordance with a preferred embodiment, internal duct lip portion 204 and external duct lip portion 206 are preferably substantially curvature continuous. As depicted in FIG. 2b, the design of the duct lip is such that the duct lip design parameters are smoothly varied around the circumference of the duct. Thus, there is a smooth and uniform transition from the largest duct lip cross-section 218 to the small duct lip cross-section 216. In order to be curvature continuous, the internal duct lip portion 204 and the external duct lip portion 206 may not have sharp angles in the curvature along the circumference. Rather, the changes in the curvature of the portions of the duct lip should occur smoothly and gradually. Specifically, at a given point joining two curves on the duct lip, the point may exhibit continuity in curvature. Therefore, the position, tangency, and the radius of curvature between the surfaces joined at the given point should match. If two curves exist such that they connect at a given point and as they cross the connection they turn sharply at the connection, the position and tangency between the surfaces match but the radius of curvature of the two curves does not match. Therefore, while the lines are positionally and tangentially continuous, the lines are not curvature continuous. Preferably, the duct lip exhibits substantial curvature continuity throughout the entire circumference of the duct.

The term substantially curvature continuous should be understood to mean that a substantial percentage of the surface remains curvature continuous, while allowing for slight deviations in the curvature continuity of the duct lip. Therefore, it should be understood that being substantially curvature continuous does not require that the duct lip must exhibit curvature continuity at every single mathematical point on the duct lip. Curvature continuity can be broken due to manufacturing defects and/or ordinary wear and tear of the ducted fan air-vehicle through use and transportation. For example, a small portion of the surface of the internal portion 204 or the external portion 206 of the duct lip may be scratched or indented during the manufacturing process or use of the ducted fan. Such a scratch or indentation may break the curvature continuity of the surface at the point of the scratch or indentation. Further, a fillet may be used around the duct in order to fill in portions or smooth out edges of a duct. The use of a fillet may lead to a point of tangential continuity but not curvature continuity. Therefore, in some cases, while the entire surfaces of the internal duct lip portion 204 and the external duct lip portion 206 (i.e., 100% of the surface) may not be curvature continuous, the surface may still remain substantially curvature continuous. In order to be substantially curvature continuous, a large percentage of the duct may be curvature continuous around the circumference. For example, if the surface of the duct lip is curvature continuous on 90% of the surface locations on the duct lip, the duct lip is substantially curvature continuous.

Further, as depicted in FIG. 2d, the external lip bluntness of the cross-sections may vary. The external lip bluntness may be defined as the following:

$$\frac{(Y \text{ value at axial station that is } 5\% \text{ of } X)}{(Y \text{ value at axial station that is } 10\% \text{ of } X)} * \frac{Y}{X} * \frac{Y}{R_H},$$

where Y is equal to the radial distance from the highlight location 208 to the location 210 of maximum radial thickness, X is equal to the distance axially down the duct from the highlight location 208 to the location 210 of maximum radial thickness, and $R_H$ is equal to the radius of the highlight. In FIG. 2d the external lip bluntness varies between approximately 0.05 and 0.35. However, the external bluntness range may be different. For example, the external bluntness could range from 0.25 to 0.4. It should be understood that the external lip bluntness may vary differently depending on the desired duct size, desired aerodynamic characteristics, and additional design parameters of the duct.

Experimental analysis has shown that the duct lip shape of duct lip 202 satisfies aerodynamic requirements of a ducted fan air-vehicle through low distortion and reduced drag. The shape of the duct lip 202 described provides good flow attachment at various flow conditions and keeps velocity and pressure uniform at the fan face while allowing for variations in the geometry of the duct lip in order to help with storage. Keeping flow uniform circumferentially around the duct cuts down on pressure variations around the fan which cause acoustic issues. The increased thickness in the geometry of the duct provides additional storage space for equipment to be stored in the duct. For example, the additional storage volume may be used to store, without limitation, avionics equipment, sensors, payload, and fuel. Depending on the chord of the duct and the size of the electrical components, the external duct lip portion cross-section may be altered as needed while maintaining the same lip height.

The duct depicted in FIGS. 2a-2d may be used in any ducted fan. As mentioned above, duct 200 may be incorporated into a ducted fan air-vehicle such as ducted fan air-vehicle 100. Further, the duct could be used in a conventional aircraft that does not have a high top end speed. The duct would augment the thrust of the aircraft at low speeds. Still further, the internal duct lip shape described above could be used in joint strike fighter jets that have a fan in the nose. Other applications are possible as well.

Figure 3A:
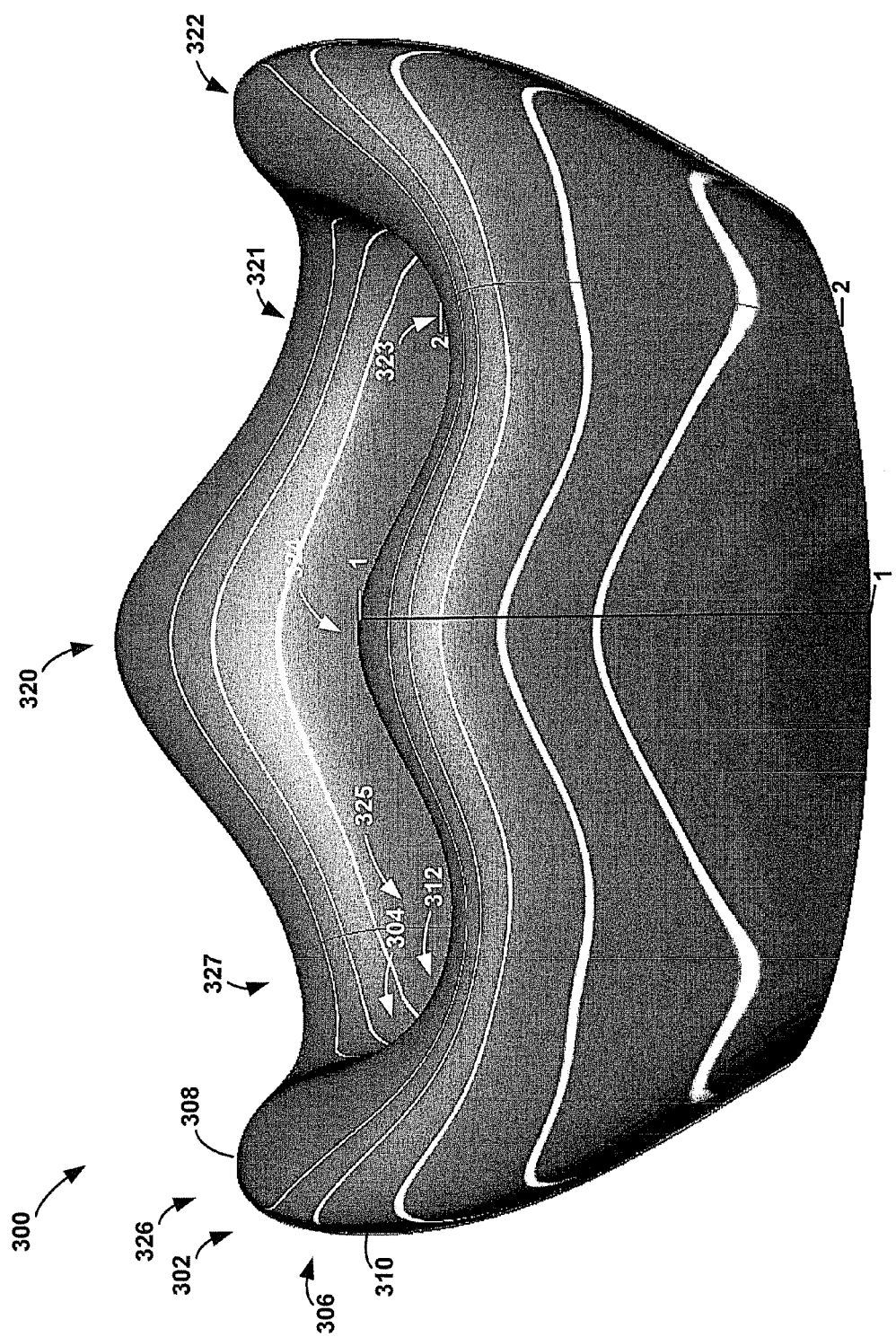
FIG. 3a is a pictorial representation of a perspective view of an air duct having a duct lip shape, according to an example.
Figure 3B:
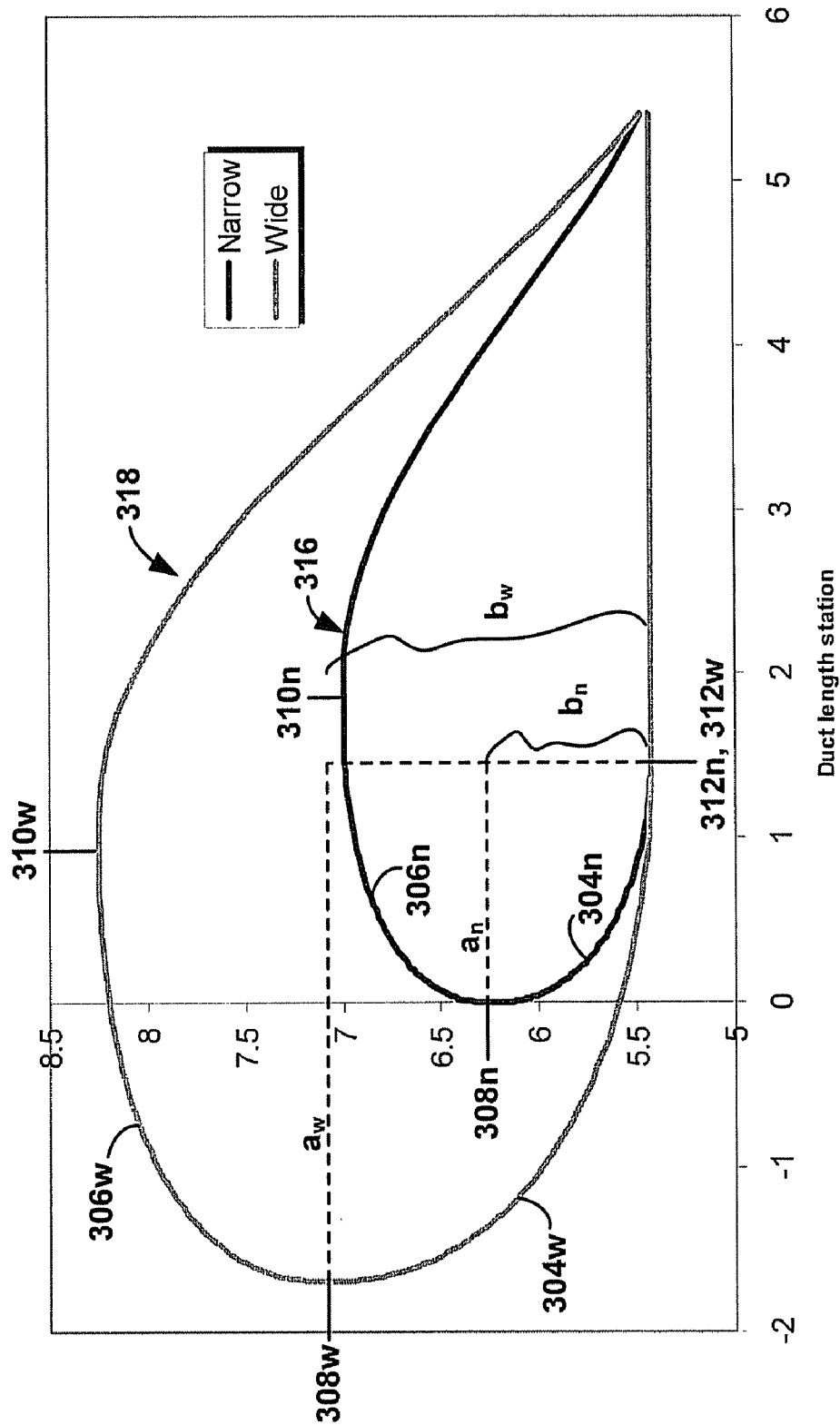

Another preferred embodiment is depicted in FIGS. 3a-3b. A duct having a duct lip shape in accordance with another preferred embodiment may be described by reference to FIGS. 3a-3b. Specifically, FIG. 3a is a pictorial representation of a perspective view of an air duct 300 having a duct lip shape in accordance with a preferred embodiment. FIG. 3b is a graph of a wide cross-section and a narrow cross-section of the air duct 300 depicted in FIG. 3a.

As depicted in FIG. 3a, duct 300 has a duct lip 302. Duct lip 302 comprises an internal duct lip portion 304 and an external duct lip portion 306. A cross-section of the duct may be taken along the circumference of the duct. For example, a cross-section may be taken at the line depicted by 1-1, which is a cross-section at a wide portion of the duct. A cross-section could also be taken at the line depicted by 2-2, which is a cross-section at a narrow portion of duct 200. Further, a cross-section could be taken at any other point along the circumference. Therefore, duct 300 has a plurality of cross-sections around the circumference of the duct.

Each duct cross-section includes a duct lip highlight location 308 and a location 310 of maximum radial distance. Further, the duct 300 has a location 312 where the throat is located. The throat is the location of the ducted fan where the interior duct lip ends and the fan shroud begins.

The cross-sections and locations 308, 310, and 312 may be further described with reference to FIG. 3b. FIG. 3b depicts two cross-sections of the duct. Specifically, FIG. 3b depicts a narrow cross-section 316 taken along line 2-2 in FIG. 3a and a wide cross-section 318 taken along line 1-1 in FIG. 3a. In FIG. 3b the X-axis represents the axial height of the duct and the Y-axis represents the radial length of the duct from a center of the duct. It should be understood that the values associated with these cross-sections are examples of a preferred embodiment only. Specific values may be varied in accordance with desired duct size, desired aerodynamic characteristics, and other design parameters.

Similar to the duct described in relation to FIGS. 2a-2d, duct lip highlight location 308 is the forward most point on the duct lip 302 in the axial direction. The duct lip highlight location for narrow cross-section 316 is shown as 308$n$ in FIG. 3b and the duct lip highlight location for wide cross-section 318 is shown as 308$w$ in FIG. 3b. Such notation is used at other locations in FIG. 3b in order to distinguish certain locations for narrow cross-section 316 and wide cross-section 318. The location 310 of maximum radial distance is the point of maximum radial thickness in the cross-section. Location 312 is the location the throat of the air duct 300 begins and the location the internal portion 304 of the duct lip ends.

The internal duct lip portion 304 is the portion of the duct lip that goes from duct lip highlight location 308 to the throat location 312. The shape of the internal duct lip portion 304 is defined by the curve between locations 308 and 312. The external duct lip portion 306 goes from the duct lip highlight location 308 to the location 310 of maximum radial thickness. The shape of the external duct lip portion 306 is defined by the curve between locations 308 and 310.

Each cross-section has a property defined as the a/b ratio of the duct lip 302. As described with reference to FIGS. 2a-2d, in the a/b ratio, the a is defined by the line which goes axially from the duct lip highlight location 308 to the location 312 where the throat is located. Further, b is defined by the line which goes radially from the throat location 312 to duct lip highlight location 308.

In FIGS. 3a-3b, the a/b ratio is substantially the same in each cross-section taken along the circumference of the duct. As is depicted in FIG. 3b, the a/b ratio for wide cross-section 318 is equal to the a/b ratio for narrow cross-section 316. Specifically, a for wide cross-section 318 is equal to $a_w$ and b for wide cross section is equal to $b_w$. For narrow cross section, a is equal to $a_n$ and b is equal to $b_n$. As can be seen, the $a_w/b_w$ is equal to $a_n/b_n$. In FIG. 3b, the a/b ratio of each cross-section is equal to 2. Unlike in the duct 200 depicted in FIG. 2d, the axial height of the highlight location changes for different cross-sections. As can be seen, in order to keep the a/b ratio the same for each cross-section, the radial distance of the highlight location also changes, making b larger when a is larger.

As with FIG. 2d, it is possible that the a/b ratio of each cross-section is not exactly the same. For example, each a/b ratio of each cross-section may be within a percentage of another. This percentage may vary. For example, the a/b ratios of each cross-section may be within 10% of the other cross-sections.

In the preferred embodiment depicted in FIGS. 3a-3b, the axial height of the highlight may vary for a plurality of cross-sections and the radial distance of the location of maximum thickness may vary for a plurality of cross-sections. As depicted in FIG. 3b, for narrow cross-section 316, the location of the axial height of the highlight is 0 (which corresponds to a chord length of approximately 5.4) and the maximum radial distance is approximately 7. For the wide cross-section 318, the location of the highlight is at approximately −1.7 (which corresponds to a chord length of approximately 7) and the location of maximum radial distance is approximately 8.25.

When a duct is designed to have four wide cross-sections such as narrow-cross-section 318 separated approximately 90 degrees from each other along the circumference and narrow cross-sections such as narrow cross-section 316 between the wide cross-sections, the cross-section design leads to the claw-shaped duct design shown in FIG. 3a. The duct 300 has a plurality of peaks 320, 322, 324, 326 and a corresponding plurality of troughs 321, 323, 325, 327 throughout the circumference of the duct. The number of peaks and troughs may vary depending on design parameters and desired air flow conditions characteristics. In a preferred embodiment, the axial height of the highlight may be slightly biased toward the troughs in order to reduce blockage of flow by the peaks in forward flight. The chord length of the duct 300 varies between approximately 5.4 and 6. However, the chord may be larger or smaller depending on the desired design parameters.

Similar to FIGS. 2a-2d, the internal duct lip may be elliptically shaped or super-elliptically shaped. In a preferred embodiment, the super elliptical shape defined by the above equation, where the exponent n is in the range of 1.5 to 2.5. However, the exponent n may be larger or smaller depending on the design parameters of the duct and desired air flow conditions at the duct lip. For example, the exponent n may be as large as 5. Further, the shape of the external duct lip portion 306 may be substantially rounded. For example, the external duct lip portion can be circular or elliptical. Other smooth or substantially curvature continuous shapes are possible as well.

Similar to duct 200 described above, the internal duct lip portion 304 and external duct lip portion 306 are preferably substantially curvature continuous. The variation in the axial height should be substantially smooth (i.e., substantially curvature continuous).

Further, each cross-section of a duct, such as duct 300, has a contraction ratio defined by the following equation:

$$(R_H/R_T)^2.$$

$R_H$ is the radius of the highlight and $R_T$ is the radius of the throat. In the embodiment depicted in FIGS. 3a-3b, the contraction ratio varies from approximately 1.32 to 1.7. However, the contraction ratio may vary depending on the desired design parameters. For instance, the contraction ratio may vary between 1.15 and 2. Other ranges are possible as well. With reference to FIG. 2d, the contraction ratio of each cross-section of duct 200 is the same because the radius of the highlight and the radius of the throat remain constant for each cross-section.

Larger contraction ratios correspond to lower peak velocities over the duct lip and smaller adverse pressure gradients, which result in more stable, attached flow in a larger range of velocities and angles of attack. The axial distance between the highlight of the peak and the highlight of the trough along with the nature of the circumferential variation along the surface can affect the axial velocity of the swirl going into the fan. When noticeable differences occur in the flow at circumferential stations around the duct, there is an increase in the acoustic signature due to unsteady and possibly harmonic pressure fluctuations on the fan blade. Advantageously, creating a gradual change in the curvature of the cross-sections from a peak to a trough around the duct reduces such fluctuations.

As depicted in FIG. 3b, the external lip bluntness of the cross-sections may vary. For instance, in FIG. 3b the external lip bluntness may vary between approximately 0.05 and 0.07. However, the external bluntness range may be different. For example, the external bluntness could range from 0.025 to 0.08. It should be understood that the external lip bluntness may vary differently depending on the desired duct size, desires aerodynamic characteristics, and additional design parameters of the duct.

Experimental analysis has shown that the duct lip shape of duct lip 302 satisfies aerodynamic requirements of the fan and vehicle through low distortion and reduced drag. The shape of the duct lip 302 described provides good flow attachment at various flow conditions and keeps velocity and pressure uniform at the fan face while allowing for variations in the geometry of the duct lip in order to help with storage. Keeping flow uniform circumferentially around the duct cuts down on pressure variations around the fan which cause acoustic issues. The increased thickness in the geometry of the duct provides additional storage space for equipment to be stored in the duct. For example, the additional storage room may be used to store, without limitation, avionics equipment, sensors, payload, and fuel.

Additionally, adjusting the design of the peaks 320, 322, 324,326 and troughs 321, 323, 325, 327 may be useful for adjusting the center of gravity of a ducted fan air-vehicle utilizing duct 300. For stability, the center of gravity of a ducted fan air-vehicle should be at or above the duct lip. In order to accomplish this, portions of the highlight of the duct lip may be raised with respect to the troughs. This claw-shaped duct lip allows internal components to be placed higher in the duct lip, which consequently moves the center of gravity of the vehicle up. Fuel may also be placed inside of the duct peaks in order to be closer to the center of gravity, which reduces the center of gravity travel due to fuel consumption. The radial length of the external duct lip portion may vary circumferentially around the duct when the highlight distance changes in order to control the internal volume of the duct.

The duct depicted in FIGS. 3a-3b may be used in any ducted fan. For instance, duct 300 may be incorporated in a ducted fan air-vehicle such as ducted fan air-vehicle 100. Further, the duct could be used in a conventional aircraft that does not have a high top end speed. The duct would augment the thrust of the aircraft at low speeds. Still further, the internal duct lip shape described above could be used in joint strike fighter jets that have a fan in the nose. Other applications are possible as well.

Figure 4:
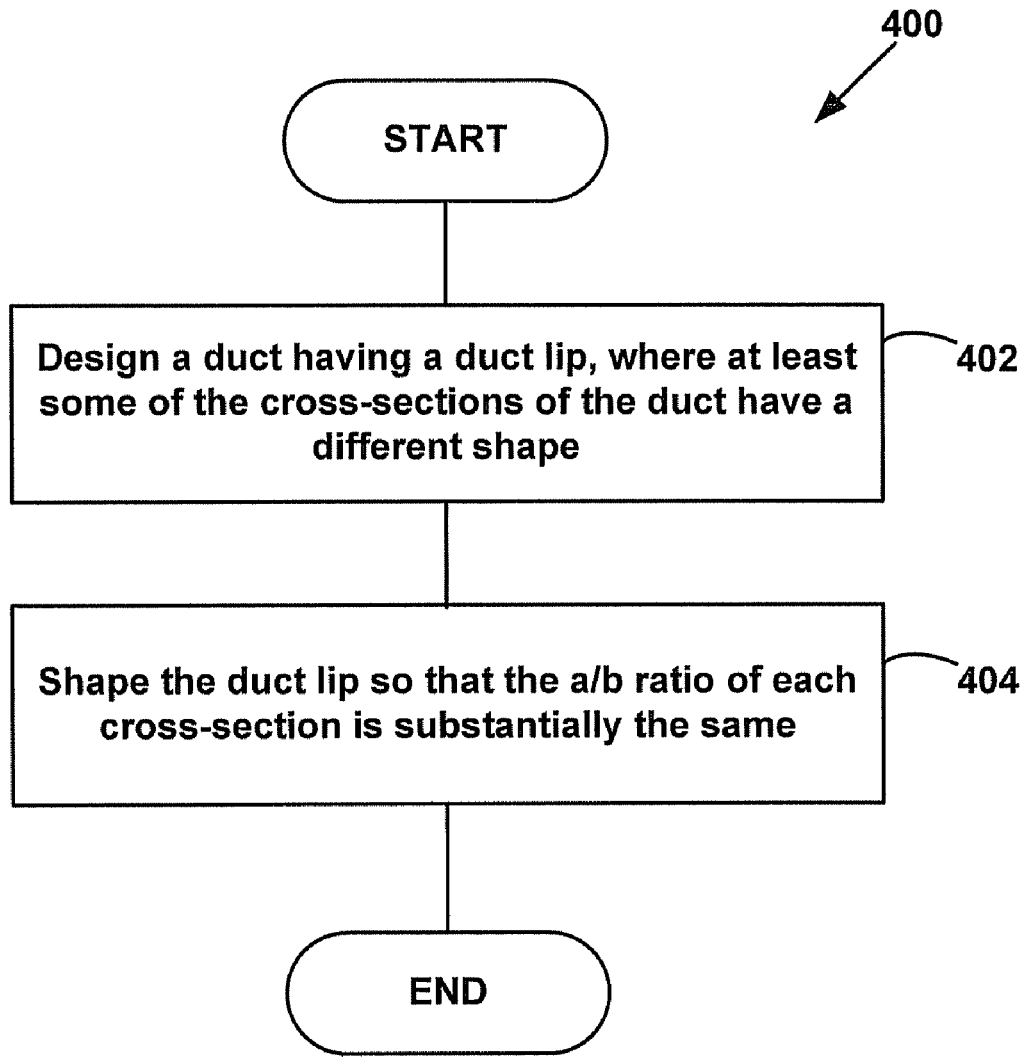
FIG. 4 is a flow chart depicting a method for shaping a duct lip of a ducted-fan air-vehicle, according to an example.

FIG. 4 is a flow chart depicting a method 400 for shaping the lip of an air duct, such as air duct 200 or air duct 300. The steps may be carried out by a manufacturing machine and/or a human. The example depicted in FIG. 4 may be carried out during the manufacturing process of building a ducted fan air-vehicle. At block 402, one may design a duct having a duct lip, where at least some of the plurality of cross-sections of the duct lip have a different shape. For example, one may design a duct depicted in FIGS. 2a-2d and 3a-3b. At block 404, one may design the shape of the duct lip such that the a/b ratio of each cross-section is substantially the same. One may also design the shape of the duct lip so that the shape of the duct lip around the circumference of the duct such that the shape of the duct lip is substantially curvature continuous around the circumference of the duct lip.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A ducted fan air-vehicle comprising:
    an air duct comprising a duct lip and defining a circumference, wherein the duct lip comprises an internal duct lip portion and an external duct lip portion,
    wherein the internal duct lip portion is substantially curvature continuous around the circumference of the air duct, and the external duct lip portion is substantially curvature continuous around the circumference of the air duct, wherein the air duct comprises a plurality of cross-sections along the circumference, each of the cross-sections being taken from a plane emanating radially out from a centerline of the air duct, wherein at least some cross-sections of the plurality of cross-sections have different shapes, wherein each cross-section of the plurality of cross-sections has an a/b ratio, the "a" in the a/b ratio being defined by a first line that extends axially from a highlight location of the duct lip to a throat location of the air duct, and the "b" in the a/b ratio being defined by a second line that extends radially from the throat location of the air duct to the highlight location of the duct lip, and wherein the a/b ratio of each cross-section of the plurality of cross-sections is substantially the same.

2. The ducted-fan air-vehicle of claim 1, wherein the a/b ratio is in a range of 1.9 to 2.5.

3. The ducted fan air-vehicle of claim 1, wherein each cross-section of the duct has a duct lip highlight location having an axial height and a location of maximum thickness having a radial distance from a center of the duct, wherein the axial height of the duct lip highlight location is constant in each cross-section around the circumference, and wherein the radial distance from the center of the duct to the location of maximum thickness varies for a plurality of the cross-sections around the circumference.

4. The ducted fan air-vehicle of claim 3, wherein the radial distance varies for a plurality of the cross-sections around the circumference such that the duct has a plurality of bulges around the circumference.

5. The ducted fan air-vehicle of claim 4, wherein the plurality of bulges comprises four bulges that form a substantially square shape around the circumference of the duct.

6. The ducted fan air-vehicle of claim 1, wherein the internal duct lip portion is elliptically-shaped.

7. The ducted fan air-vehicle of claim 1, wherein the internal duct lip portion is super-elliptically-shaped.

8. The ducted fan air-vehicle of claim 7, wherein a super-elliptical shape is defined by the equation $$\left|\frac{x}{a}\right|^n + \left|\frac{y}{b}\right|^n = 1,$$

wherein n is within the range of 2 to 4.

9. The ducted fan air-vehicle of claim 1, wherein the external duct lip portion is elliptically-shaped.

10. The ducted fan air-vehicle of claim 1, wherein each cross-section of the duct has a duct lip highlight location having an axial height and a location of maximum thickness having a radial distance from a center of the duct, wherein the duct lip highlight axial height varies for a plurality of cross-sections around the circumference, and wherein the radial distance from the center of the duct to the location of maximum thickness varies for a plurality of the cross-sections around the circumference.

11. The ducted fan air-vehicle of claim 10, wherein the axial height varies for a plurality of cross-sections such that there are a plurality of peaks along the circumference of the duct and a plurality of troughs along the circumference of the duct.

12. The ducted fan air-vehicle of claim 11, wherein the plurality of peaks comprises four peaks separated by substantially 90 degrees along the circumference of the duct.

13. The ducted fan air-vehicle of claim 10, wherein each cross-section of the plurality of cross-sections has a contraction ratio, and at least two cross-sections of the plurality of cross-sections have different contraction ratios, and wherein the contraction ratios of the plurality of cross-sections are in a range of 1.15 to 2.

14. The ducted fan air-vehicle of claim 10, wherein when the duct lip highlight location increases in axial height along the circumference, the radial distance around the circumference increases.

15. A ducted fan air-vehicle comprising:

an air duct comprising a duct lip and comprising a circumference, wherein the air duct comprises a plurality of cross-sections along the circumference, each of the cross-sections being taken from a plane emanating radially out from a centerline of the air duct, wherein at least some cross-sections of the plurality of cross-sections have different shapes, wherein each cross-section of the plurality of cross-sections has an a/b ratio, the "a" in the a/b ratio being defined by a first line that extends axially from a highlight location of the duct lip to a throat location of the air duct, and the "b" in the a/b ratio being defined by a second line that extends radially from the throat location of the air duct to the highlight location of the duct lip, and wherein the a/b ratio of each cross-section of the plurality of cross-sections is substantially the same.

16. A method for shaping an air duct of an air vehicle, the air duct comprising a duct lip and defining a circumference, the method comprising:

shaping the air duct such that the air duct comprises a plurality of cross-sections along the circumference, each of the cross-sections being taken from a plane emanating radially out from a centerline of the air duct, wherein at least some of the cross-sections of the plurality of cross-sections have different shapes; and shaping the duct lip such that an a/b ratio of each cross-section of the plurality of cross-sections is substantially the same, the "a" in the a/b ratio being defined by a first line that extends axially from a highlight location of the duct lip to a throat location of the air duct, and the "b" in the a/b ratio being defined by a second line that extends radially from the throat location of the air duct to the highlight location of the duct lip.

17. The method of claim 16, further comprising:

varying the shape of the duct lip around the circumference of the duct such that the shape of the duct lip is substantially curvature continuous around the circumference of the duct lip.

18. The ducted-fan air-vehicle of claim 1, wherein the a/b ratio of each cross-section of the plurality of cross-sections is within 10% of the a/b ratio of the other cross-sections of the plurality of cross-sections.

19. The ducted-fan air-vehicle of claim 1, wherein the a/b ratio of each cross-section of the plurality of cross-sections is the same.

20. The ducted-fan air-vehicle of claim 1, wherein a contraction ratio of each cross-section of the plurality of cross-sections is the same.

* * * * *